(12) United States Patent
De Coi (10) Patent No.: US 8,868,376 B2
(45) Date of Patent: Oct. 21, 2014

(54) APPARATUS FOR MONITORING A DOOR WITH A 3D SENSOR

(75) Inventor: Beat De Coi, Sargans (CH)

(73) Assignee: Cedes AG, Landquart (CH)

( * ) Notice: Subject to any disclaimer, the term of this patent is extended or adjusted under 35 U.S.C. 154(b) by 322 days.

(21) Appl. No.: 13/295,624

(22) Filed: Nov. 14, 2011

(65) Prior Publication Data

US 2012/0150487 A1    Jun. 14, 2012

(30) Foreign Application Priority Data

Nov. 15, 2010 (EP) .................................... 10014616

(51) Int. Cl.
*F16P 3/14* (2006.01)
*G01B 21/16* (2006.01)

(Continued)

(52) U.S. Cl.
CPC ............... *G01S 7/4972* (2013.01); *G01B 21/16* (2013.01); *G01C 3/00* (2013.01); *F16P 3/14* (2013.01); *E05F 15/0026* (2013.01); *E05F*

(Continued)

(58) Field of Classification Search
CPC ......... E05F 1/00; E05F 1/002; E05F 15/0004; E05F 15/0021; E05F 15/0026; E05F 15/20; E05F 15/2023; E05F 15/2013; E05F 2015/00; E05F 2015/0004; E05F 2015/0021; E05F 2015/0026; E05F 2015/0034; E05F 2015/0039; E05F 2015/0043; E05F 2015/20; E05F 2015/2023; E05F 2015/2053; E05F 2015/2061; F16P 3/00; F16P 3/12; F16P 3/14; F16P 3/141; F16P 3/147; G01B 7/00; G01B 7/003; G01B 7/02; G01B 7/023; G01B 7/14; G01B 11/00; G01B 11/02; G01B 11/026; G01B 11/14; G01B 15/00; G01B 17/00; G01B 21/00; G01B 21/02; G01B 21/16; G01D 7/00; G01D 9/00; G01D 21/00; G01S 13/00; G01S 13/02; G01S 15/00; G01S 15/02; G01S 17/00; G01S 17/02; G01S 17/026; G01S 17/87; G01S 2007/00; G01S 2007/02; G01S 2007/0207; G01S 2013/00; G01S 2015/00; G01S 2015/02; G01S 2015/88; G06F 11/00; G06F 11/30; G06F 11/32; G06F 11/34; G06F 17/00; G06F 17/40; G06F 19/00

USPC .............. 49/25, 26, 31, 322; 73/432.1, 865.8; 181/123; 356/3, 614; 367/87, 93, 94, 367/95, 96, 99, 118, 127, 128; 700/1, 90, 700/245, 250, 255, 258, 302; 702/1, 127, 702/150, 155, 158, 159, 187, 189

See application file for complete search history.

(56) References Cited

U.S. PATENT DOCUMENTS 3,278,922 A * 10/1966 Andrews ...................... 340/553
3,327,307 A *  6/1967 Miles .......................... 342/112

(Continued)

FOREIGN PATENT DOCUMENTS

DE        198 33 157 A1    1/2000

(Continued)

OTHER PUBLICATIONS

Timo Kahlmann, et al., "Calibration of the Fast Range Imaging Camera SwissRanger™ for the Use in the Surveillance of the Environment," Proceedings of SPIE, vol. 6396, Jan. 1, 2006, pp. 639605-1 to 639605-12.

*Primary Examiner* — Edward Cosimano (74) *Attorney, Agent, or Firm* — Burr & Brown, PLLC (57) ABSTRACT

An apparatus for monitoring a door with a 3D sensor which is able to detect distances to an object in the monitoring area as the third dimension, the 3D sensor being arranged in a housing, and immovably arranged transmission means for transmitting a measurement beam and receiver means for receiving a reflected measurement beam being provided in the housing, characterized in that provision is made of a control unit which is designed to obtain an item of information relating to the position of the apparatus, and in that the control unit evaluates the measurement beam on the basis of an item of position information.

8 Claims, 12 Drawing Sheets

(51) Int. Cl.
*G01C 3/00* (2006.01)
*G01S 7/497* (2006.01)
*E05F 15/00* (2006.01)
*F16M 11/06* (2006.01)
*F16M 13/02* (2006.01)
*G01S 7/481* (2006.01)
*G01S 17/02* (2006.01)
*G01S 17/88* (2006.01)
*E05F 15/20* (2006.01)

(52) U.S. Cl.
CPC .... 15/2023 (2013.01); *F16M 11/06* (2013.01); *F16M 13/02* (2013.01); *F16P 3/141* (2013.01); *G01S 7/4813* (2013.01); *G01S 17/026* (2013.01); *G01S 17/88* (2013.01); *H01S 17/89* (2013.01); *E05Y 2900/132* (2013.01)
USPC .................. 702/159; 49/25; 49/31; 73/865.8; 702/158

(56) References Cited

U.S. PATENT DOCUMENTS

| | | | | |
|---|---|---|---|---|
| 3,383,678 | A | * | 5/1968 | Palmer .............. 342/28 |
| 4,894,952 | A | * | 1/1990 | Trett et al. .......... 49/25 |
| 4,910,464 | A | * | 3/1990 | Trett et al. .......... 327/517 |
| 5,583,405 | A | * | 12/1996 | Sai et al. ............ 318/286 |
| 5,963,000 | A | * | 10/1999 | Tsutsumi et al. ...... 318/480 |
| 6,446,913 | B1 | | 9/2002 | Schroeder |
| 6,467,745 | B1 | | 10/2002 | Sickels |
| 6,678,999 | B2 | * | 1/2004 | Zengguang et al. ...... 49/25 |
| 2002/0036476 | A1 | * | 3/2002 | Zengguang et al. ...... 318/480 |
| 2006/0047471 | A1 | | 3/2006 | Krumm |

FOREIGN PATENT DOCUMENTS

| | | |
|---|---|---|
| DE | 102007038421 B3 * | 9/2008 |
| DE | 10 2007 051 133 A1 | 4/2009 |
| EP | 0696670 A1 * | 2/1996 |
| WO | 2010/018009 A1 | 2/2010 |

* cited by examiner

APPARATUS FOR MONITORING A DOOR WITH A 3D SENSOR

This application claims the benefit under 35 USC §119(a)-(d) of European Application No. 10 014 616.6 filed Nov. 15, 2010, the entirety of which is incorporated herein by reference.

FIELD OF THE INVENTION

The invention relates to an apparatus for monitoring a door with a 3D sensor.

BACKGROUND OF THE INVENTION

Automatic doors and revolving doors may become dangerous to users if their danger zones in front of the door leaf are not monitored. Since the dangerous components move during the opening and closing process, the danger area to be monitored also concomitantly moves. Furthermore, the size of the area to be monitored must possibly change during movement. This results in the need to concomitantly move the monitoring sensor with the dangerous component, in which case adaptation to the wide variety of different door sizes and required monitoring areas is desirable. Economic factors also require the provision of a universal sensor with monitoring properties which can be easily adapted.

On account of the given requirements, the industry is looking for sensor solutions with flexible evaluation possibilities which evaluate, for example, the third dimension which relates to the distance between the object being monitored and the sensor. Such sensors can also be used for static mounting for monitoring applications for particular monitoring areas.

The prior art discloses active infrared sensors which are mounted on a door leaf and monitor the area in front of the plane of the door at a few points. As an alternative to this, laser sensors which scan the monitoring area using beams moved using rotation mechanisms are known. However, such sensors are very complex and are therefore associated with considerable production costs. In addition, these sensors provide considerably restricted convenience during installation and adaptation to the monitoring area since a multiplicity of optical components have to be aligned.

SUMMARY OF THE INVENTION

The object of the invention is therefore to provide an apparatus for monitoring a door with a 3D sensor, which apparatus improves the mounting and/or installation convenience in comparison with the prior art with reasonable costs.

The aim of the invention is to develop a universal monitoring sensor for automatic doors (revolving doors and double doors). In this case, the area to be monitored is intended to be easily and quickly adapted to the corresponding application and mounting position. The use of the TOF (Time-of-Flight) principle makes it possible to determine the distance of an object in the monitoring area as the third dimension. This makes it possible not only to monitor a precisely defined area but to set the sensor to a precisely defined monitoring volume using knowledge of the ambient conditions of the sensor. In this case, the sensor preferably consists of a compact unit which simultaneously comprises a transmitter and a receiver. In the first step, the scene to be monitored is illuminated using LEDs, for example. The emitted light is reflected and passes back into the sensor where it is detected using the receiving unit. The receiving part consists of a TOF chip with a plurality of pixels. Each pixel may receive a measurement beam reflected by an object. Modulated IR light is used for example. In order to determine the distance, a phase shift between the received signal and the emitted signal may be evaluated. The corresponding evaluation results in a distance value for each pixel, thus achieving a three-dimensional/volume-related capture image. The optics are designed in such a manner that the illumination remains focused in individual discrete beams, which results in corresponding spots with a high light intensity.

The use of a 3D sensor for monitoring enables more flexibility in the application-specific use. The sensor provides the distance values to the object, for example in a location-dependent manner (in the x-y plane or in the plane perpendicular to the sensor axis). In the case of 2D sensors, it is only possible to state whether an object is located within the beam under consideration. The position of the object is not resolvable. However, in the case of the TOF principle, the distance can also be used for evaluation, as a result of which new possibilities arise during the intelligent evaluation of these signals.

In an apparatus for monitoring a door with a 3D sensor which is able to detect distances to an object in the monitoring area as the third dimension, the 3D sensor being arranged in a housing, and immovably arranged transmission means for transmitting a measurement beam and receiver means for receiving the reflected measurement beam being provided in the housing, one aspect of the invention is that provision is made of a control unit which is designed to obtain information relating to the position of the apparatus, and the control unit evaluates the measurement beam on the basis of an item of position information. As a result, the mounting of a monitoring apparatus can be simplified and can be made more reliable. This is because, with an item of position information, the apparatus can unambiguously assign measurement beams detected after mounting to the environment and can thus also correctly evaluate said beams. In addition, it is possible for the apparatus to align itself as it were after mounting. For example, the control unit is designed to determine a mounting height of the apparatus after mounting by evaluating the measurement beam on the basis of the item of position information. It is thus no longer necessary to input a mounting height in order to calibrate the apparatus.

In one preferred refinement of the invention, the control unit is also designed to use a height of the mounting location as a parameter for defining the monitoring area. In order to be able to completely define the monitoring area, it is then only still necessary to specify the width of the monitoring area in the case of conventional double doors. Mounting and input errors can thus be minimized.

In order to also enable automation of the determination of a position and forwarding to the control unit, it is also proposed that there are position detection means which are designed to automatically detect a position, in particular an absolute position relative to a horizontal of the housing, and to forward said position to a control unit. An inclination sensor, for example, may be provided for comprehensive detection of the position of the apparatus. It is also conceivable to provide the control unit with position information, for example via input elements, for example DIP switches.

It is also possible to detect a position relative to a preassembled base plate automatically, for example via sensor means such as switching elements.

However, it is also conceivable to achieve mounting which is as error-free as possible using suitably designed mounting means. For example, the apparatus is designed to be fitted in a horizontal basic mounting position and to be fitted in at least two further different mounting positions relative to the horizontal basic mounting position, mounting means for the housing being designed for a mounting orientation which is always the same irrespective of the mounting position of the housing, and the mounting means and the housing being matched to one another in such a manner that a unique orientation of the housing on the mounting means in the respective at least two further mounting positions is provided by the mounting means.

The practice of specifying a basic position and at least two further mounting positions, which are in the form of defined positions, makes it considerably easier for an installer to mount and orient a corresponding 3D sensor, as a result of which positioning errors and resultant malfunctions are avoided.

In order to make mounting even more reliable, it is moreover proposed that the at least two further mounting positions relate to an arrangement of the apparatus in a corner area of a door to be monitored, the mounting means allowing the housing for the corner area to be fitted in a tilted manner with an orientation of the 3D sensor relative to the door to be monitored only in such a manner that a limiting monitoring beam of a monitoring area runs at least approximately parallel to an edge of the door to be monitored. In this connection, only three mounting positions of the housing are allowed. Mounting errors can thus be precluded with correct mounting, which is always the same, using mounting means for the three positions.

In order to simply fit the housing of the apparatus to the mounting means, it is also preferred if the mounting means comprise a frame which surrounds the housing. This frame is in the form of a bracket, for example, which runs across the front of the housing and the side walls of the housing to the mounting means.

In order to achieve a high resolution of the 3D sensor, it is also proposed that the 3D sensor in a housing comprises a receiver array and/or a sensor array. A receiver array makes it possible to evaluate a large number of measurement beams, in particular at the same time, in which case a transmitter array can be used to scan a comparatively large area, in particular with a plurality of measurement beams.

A transmitter matrix and a receiver matrix are used, in particular.

In order to carry out reliable object detection and evaluation, it is also preferred if the 3D sensor is an imaging sensor in which an object point is imaged onto an associated sensor point.

BRIEF DESCRIPTION OF THE DRAWINGS

FIG. 2a shows a front view of the basic mounting position according to FIG. 1a;

DETAILED DESCRIPTION OF THE INVENTION

Figure 1A:
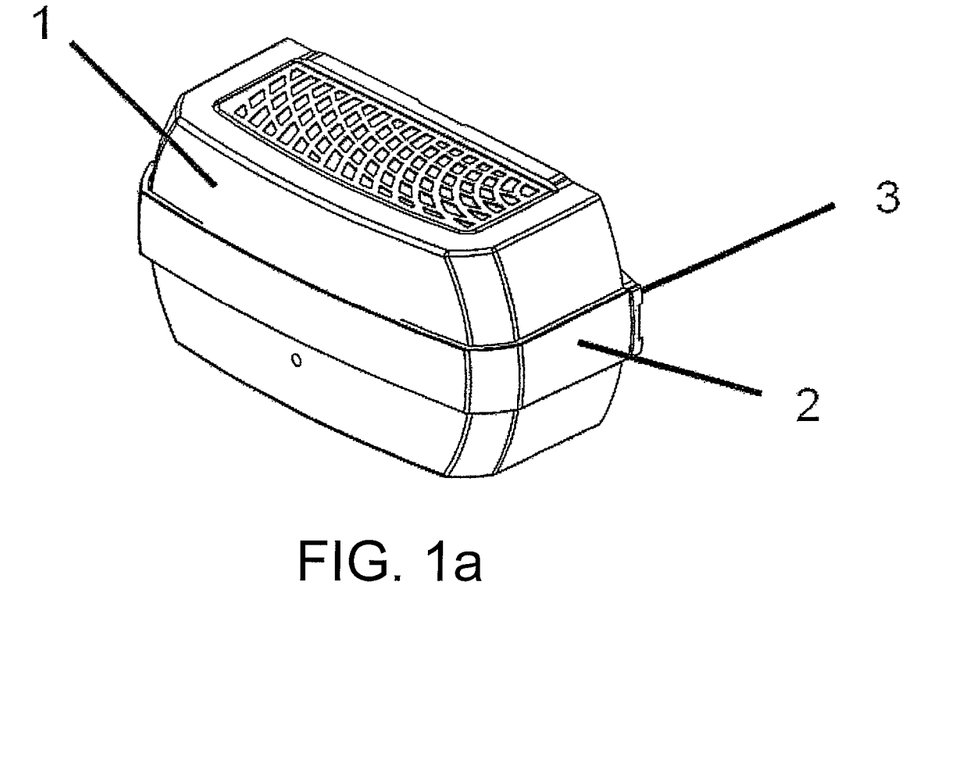
FIG. 1a shows a mounted 3D sensor in the basic mounting position.

In detail, FIG. 1a shows an illustration of a housing 1 for an apparatus according to the invention for monitoring a door. The housing 1 is at least partially surrounded by a mounting frame 2 which engages in a mounting plate 3 on the rear side of the housing 1. In this manner, the housing 1 is held on the mounting means formed by the mounting frame 2 and the mounting plate 3.

Figure 1B:
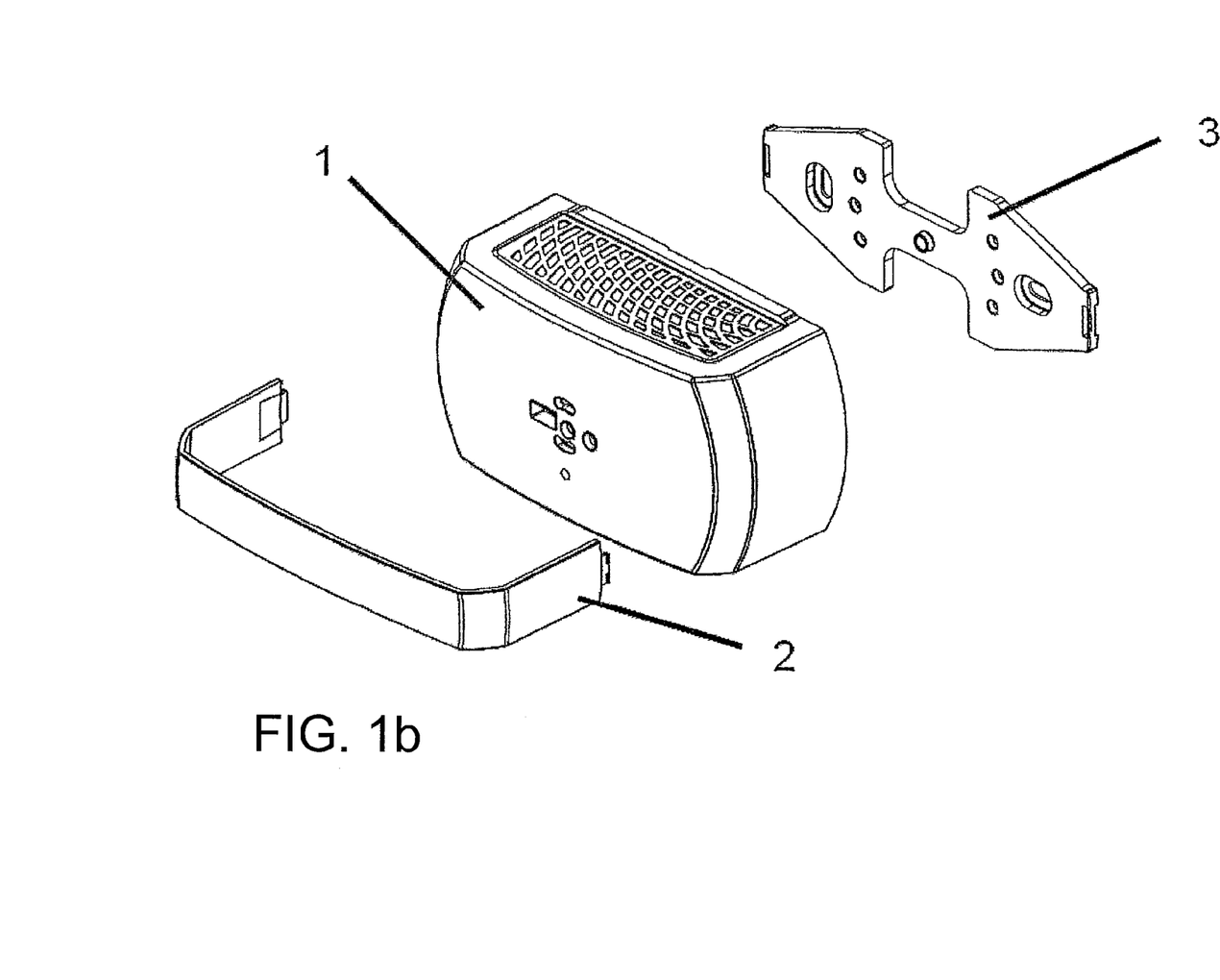
FIG. 1b shows an exploded illustration of the sensor housing and of the apparatus for fitting the sensor.

FIG. 1b shows an exploded illustration of the following parts: the housing 1, the mounting frame 2 and the mounting plate 3.

Figure 2A:
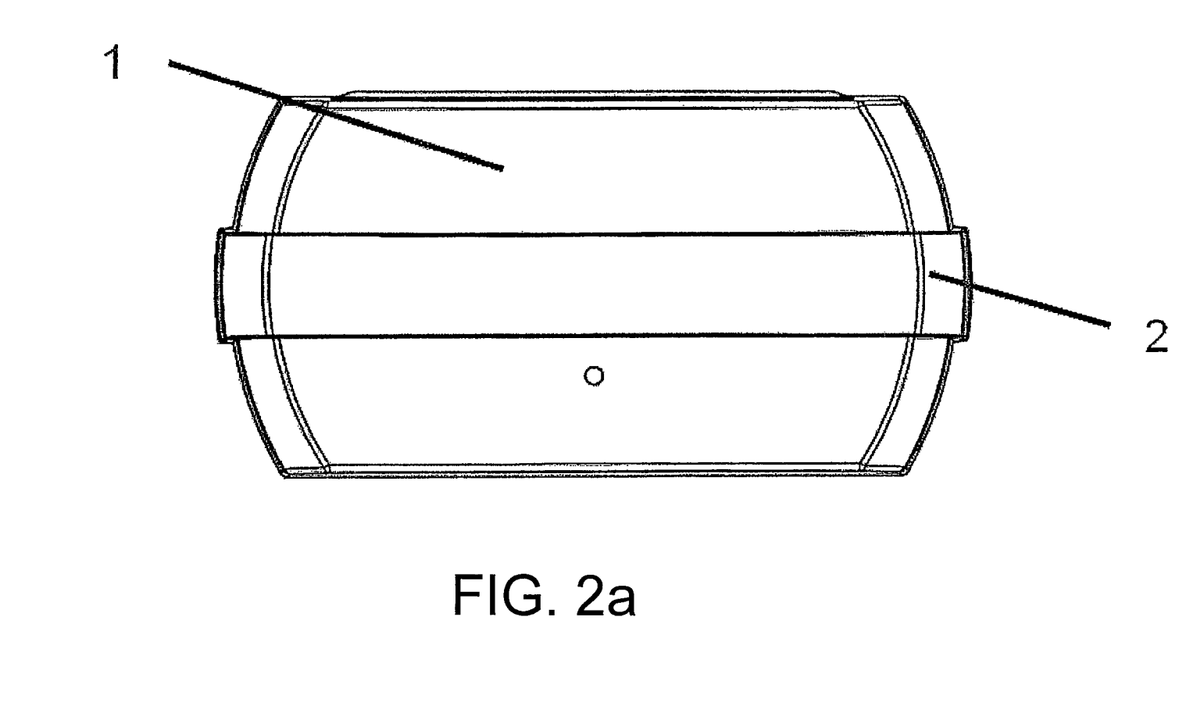

FIG. 2a shows a frontal view of the arrangement according to FIG. 1a. The housing 1 has a design corresponding to a segment of a circle on its right-hand and left-hand outer sides, the radius being adapted by the mounting frame, in particular in a manner matched to its inner side.

Figure 2B:
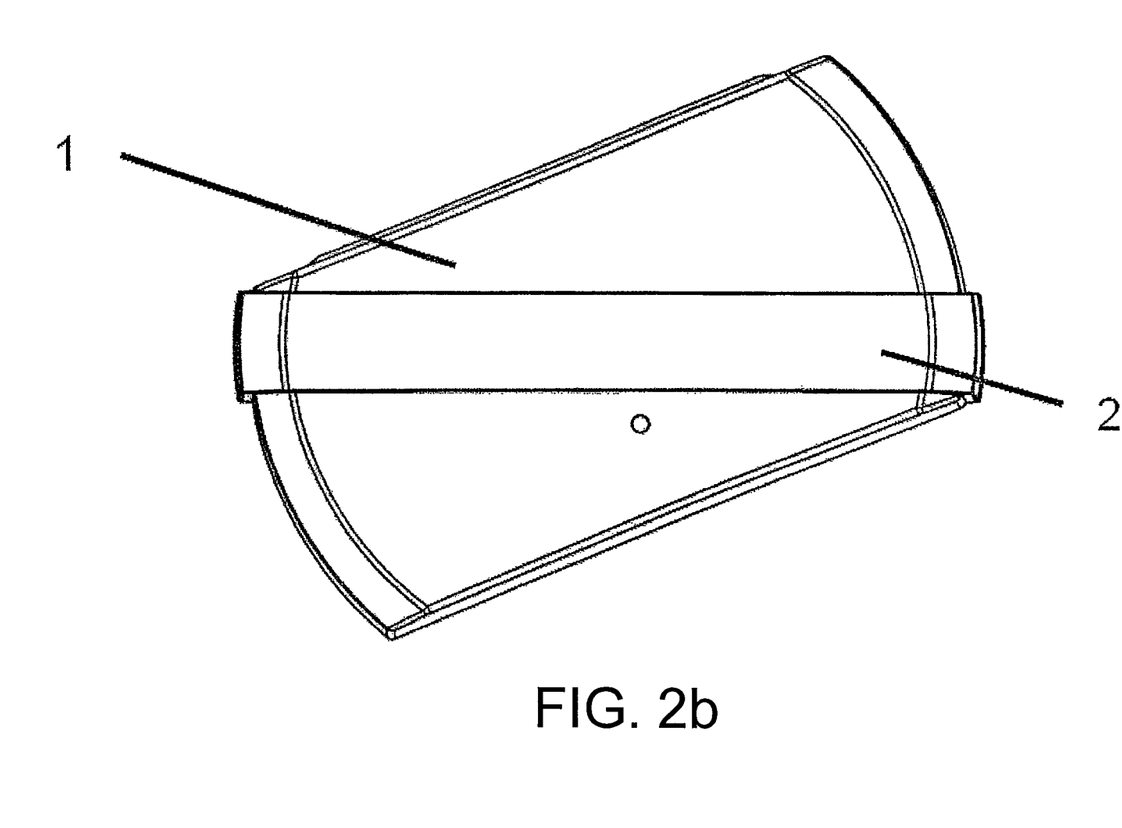
FIG. 2b shows a first further mounting position.

FIG. 2b shows a first pivoted position of the housing 1 in the mounting frame 2, the underside of the housing, on which the signals needed to monitor a door are emitted, being illustrated in the present case as having been pivoted to the right. The mounting frame 2 grips the housing 1 on the radius of the left-hand and right-hand side walls, with the result that the housing 1 is held by the mounting frame 2 with the mounting plate 3 (not illustrated here) as mounting means.

Figure 2C:
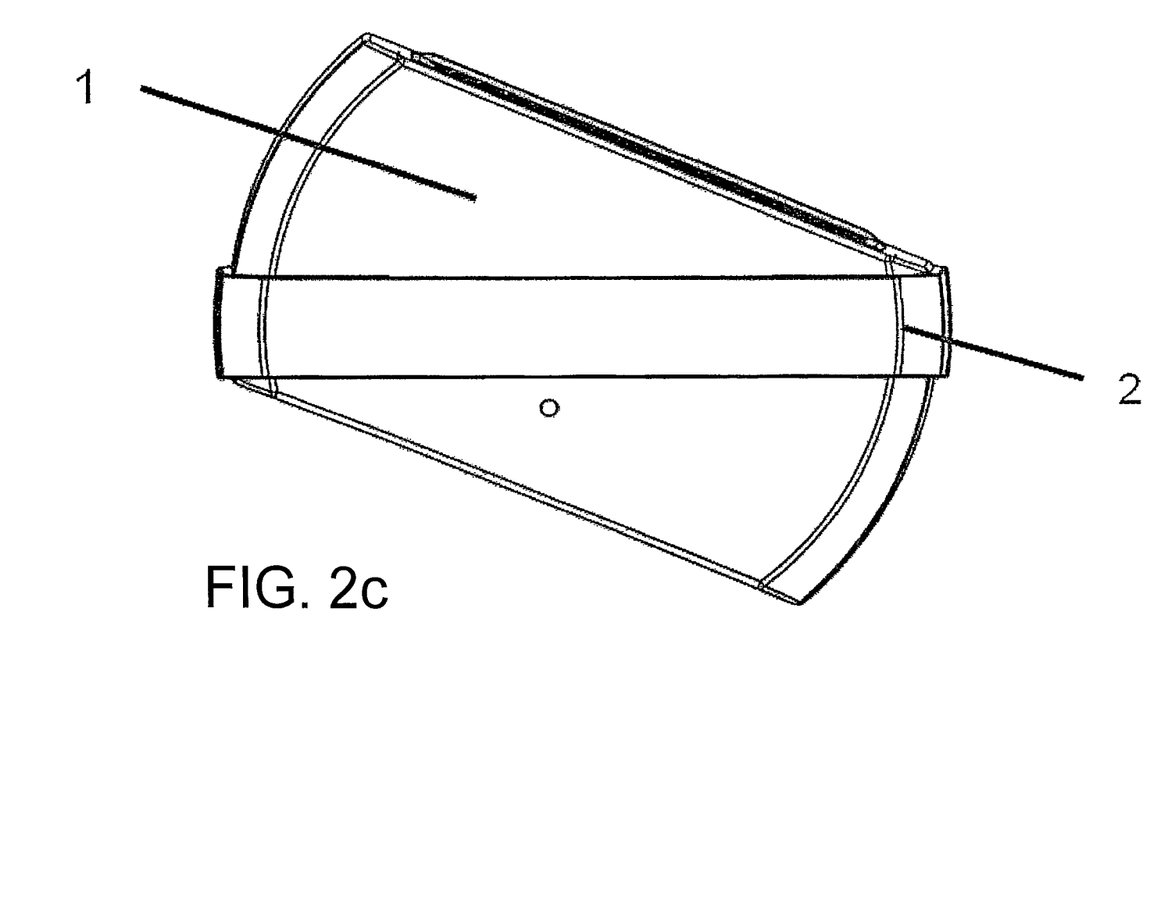
FIG. 2c shows a second further mounting position.

FIG. 2c shows an arrangement of the apparatus according to the invention for monitoring a door, which arrangement has been accordingly pivoted to the left.

Figure 3A:
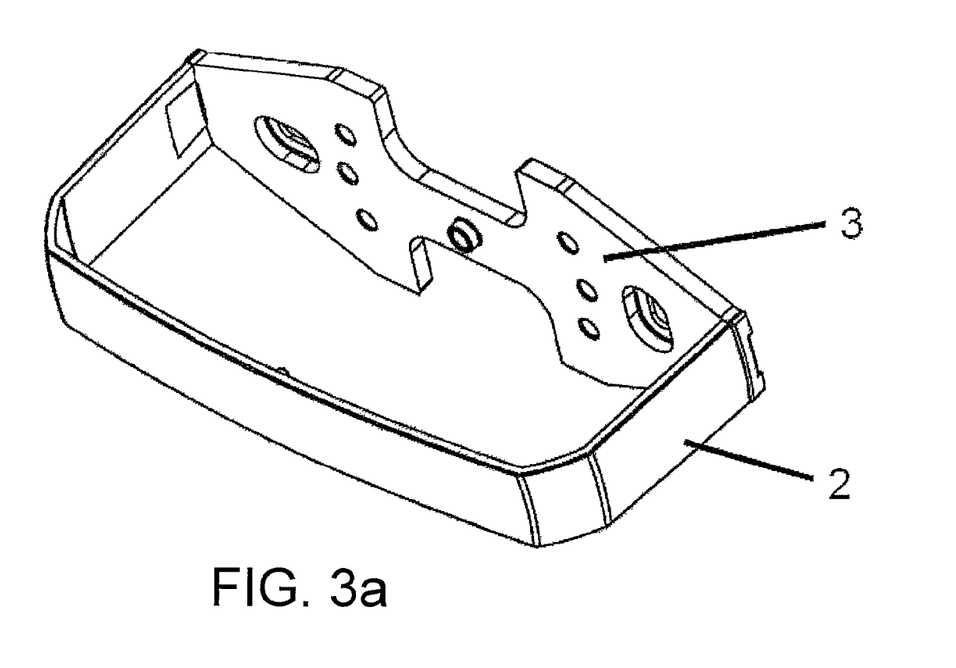
FIG. 3a shows the fitting apparatus in the closed state.

FIG. 3a shows an illustration of the mounting means consisting of the mounting frame 2 and the mounting plate 3 without a housing arranged therein. The mounting means are preassembled by fitting the mounting plate 3 to a door, after which the housing 1 with the 3D sensor contained therein is introduced into the mounting means. The mounting plate is intended for a mounting position which is always the same, for example a horizontal position.

Figure 3B:
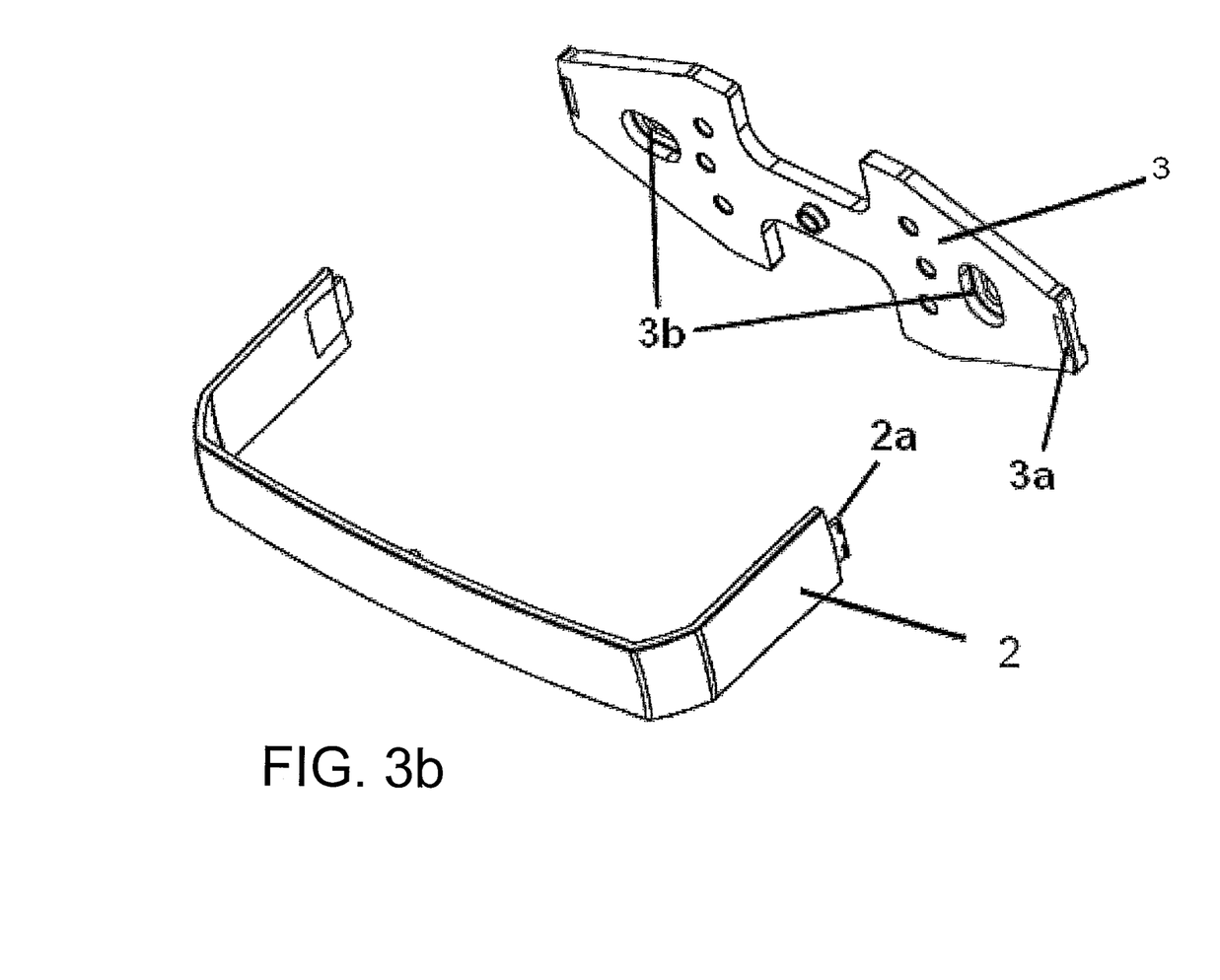
FIG. 3b shows the fitting apparatus in the open state.

FIG. 3b shows an exploded illustration of the mounting means formed from the mounting frame 2 and the mounting plate 3. In this case, the mounting frame 2 has, on its ends facing the mounting plate 3, latching hooks 2a which engage in a form-fitting manner in corresponding receptacles 3a on the mounting plate 3. The mounting plate 3 also has two mounting slots 3b which make it possible for the installer to carry out simple and precise mounting on a door leaf.

Figure 4:
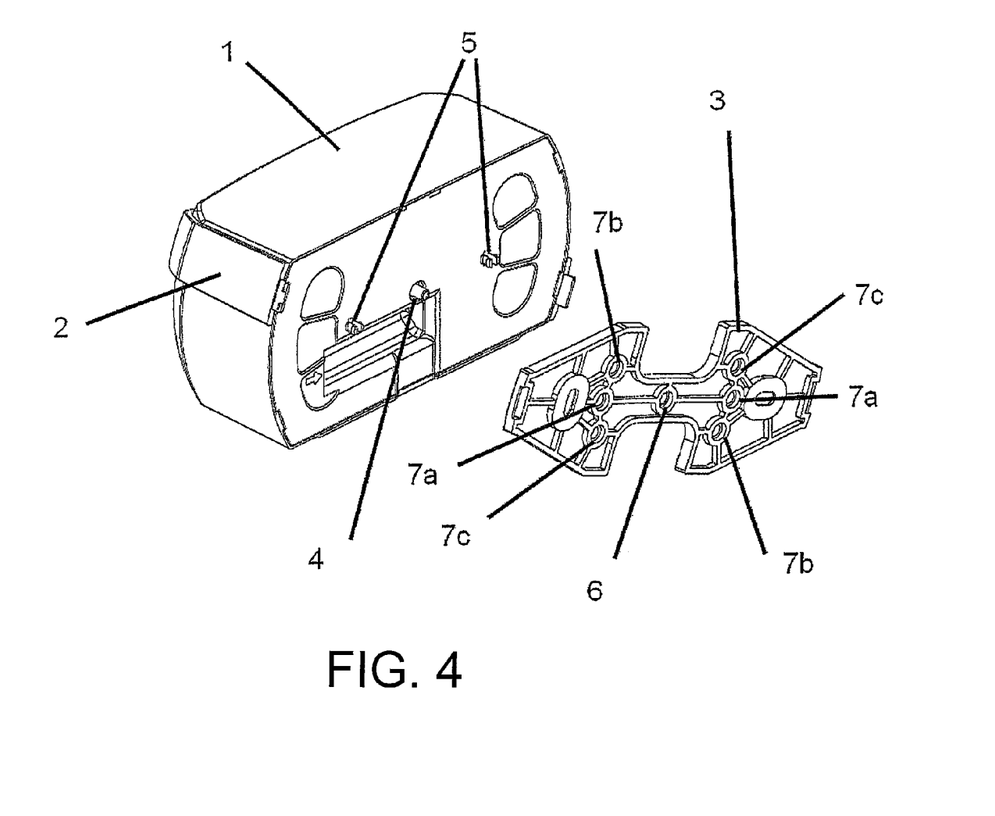
FIG. 4 shows a rear-side illustration of the fitting apparatus and of the 3D sensor.

FIG. 4 shows an exploded illustration of a housing 1 arranged in a mounting frame. In this case, the housing 1 has a plurality of pins according to the invention on its rear side. In this case, the center pin 4 present is centrally arranged in the radius of the housing 1, with the result that the housing 1 is rotatably mounted around the center pin 4 according to FIGS. 2b and 2c. Two lateral pins 5 which may preferably have latching clamping means are arranged along a horizontal direction of the housing 1 to the left and right of the center pin 4.

The mounting plate 3 illustrated has, in its center, a central bore 6 for receiving the center pin 4. According to the mounting positions illustrated in FIGS. 2a to 2c, the lateral pins 5 can be introduced, into corresponding bearing bores, the bearing bores always being arranged such that they are diagonally opposite in a rotationally symmetrical manner about the central bore 6. The first bearing bores 7a thus represent the horizontally planar mounting position. The second bearing bores 7b correspond to the pivoting (illustrated in FIG. 2b) of the beam path to the right, and the third bearing bores 7c correspond to the illustration according to FIG. 2c. In this manner, the installer has a simple predefined pattern which considerably simplifies the mounting of the apparatus for monitoring a door without accepting disadvantages with regard to the mounting precision.

Figure 5:
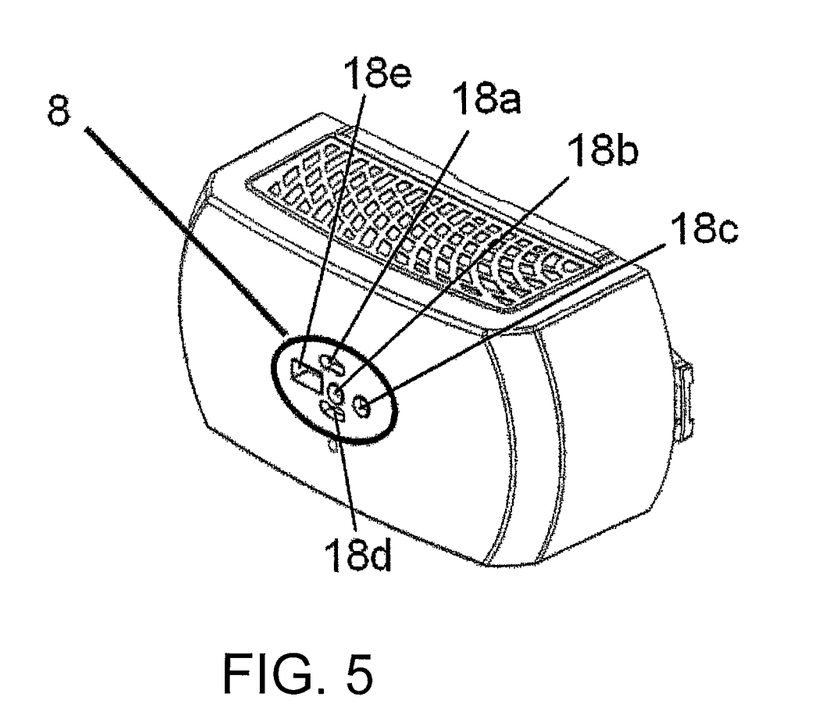
FIG. 5 shows a front view of the 3D sensor without the fitting apparatus.

FIG. 5 shows an illustration of a housing 1 with a 3D sensor contained therein, operating elements 18a, 18b, 18c, 18d and 18e, for example in the form of potentiometers or the like, being provided on the front side of the housing 1. The operating elements are arranged in an operating element area 8 which is arranged on the front side of the housing such that it is easily accessible to the installer. The installer can carry out adaptations, for example to the mounting position, and/or can set the detection field of the apparatus for monitoring a door by means of corresponding adjustment parameters. As soon as the mounting frame 2 is arranged around the housing 1, the mounting frame covers the central area 8 containing the accesses to the operating elements, the cover additionally being able to be a seal in all mounting positions.

Figure 6:
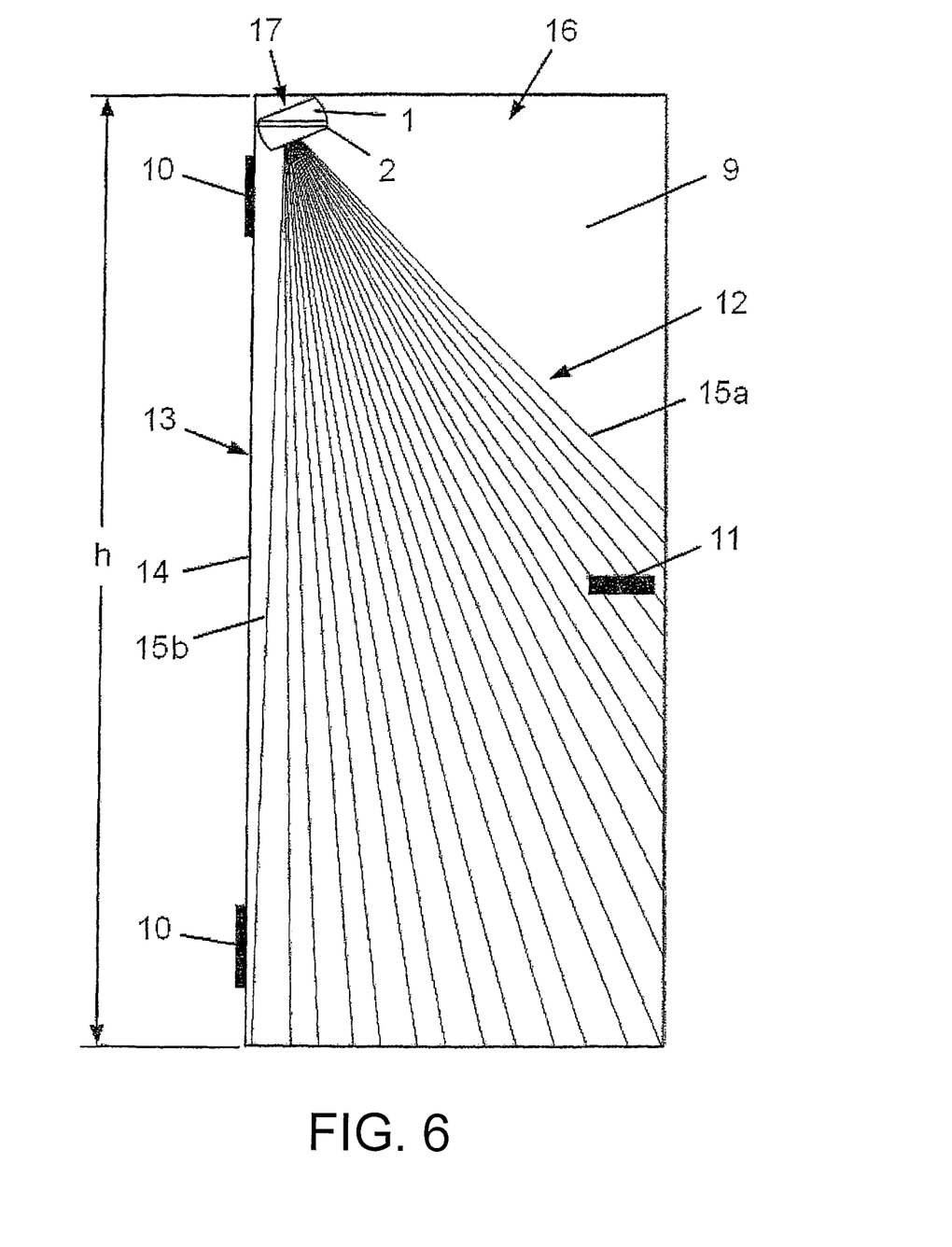
FIG. 6 shows an exemplary illustration of a mounting position.

FIG. 6 shows, by way of example, an arrangement of a 3D sensor according to the invention as an apparatus for monitoring a door, a double door 16 which is fastened on one side in the present case. In this case, the housing 1 is arranged, with the mounting frame 2, in a left-hand upper corner area 17 of the door 16. In this case, the door leaf 9 is fastened on the left-hand side by means of hinges 10 and has a door handle 11 on the right-hand side. The apparatus for monitoring a door is oriented in such a manner that it has a detection beam path 12 with an outer measurement beam 15a, which beam path has been pivoted to the right according to the illustration in FIG. 2b. On the left-hand side facing the hinges 10, the beam path is oriented in such a manner that a measurement beam 15b runs virtually perpendicular to the floor, that is to say in a virtually parallel manner along an edge 14 of a door leaf side 13. Therefore, wall elements on which the hinges 10 are arranged are not detected during pivoting of the door leaf 9.

The housing 1 is mounted on the door 16, for example at a height h. Corresponding arrangements, both centrally and on the top right-hand side, with doors which are fastened in a different way are conceivable. Central arrangements may be expedient for double-wing doors. If necessary, the housing is fastened to the door frame or to the wall, rather than to the door.

The height of the door, inter alia, can also be determined using the vertical beams on the door leaf side 13 by measuring the distance to the reflective substrate. In this case, the height of the door should be stated with reference to a defined mounting position of the mounting means 2, 3, in which case this can be easily effected by the installer, for example by presenting a mounting template for the door edge.

For example, a position sensor which detects the orientation according to FIGS. 2a, 2b and 2c is provided in the apparatus.

As an alternative to the position sensors, corresponding sensors which monitor the lateral pins and/or the bearing bores 7a to 7b, for example via push-buttons, in order to determine an orientation of the apparatus for monitoring a door therefrom are also conceivable.

Exact positions of individual objects in the danger zone of the door can be determined in this manner by means of appropriately adapted evaluation parts without having to carry out complicated highly precise mounting steps when arranging the apparatus according to the invention.

Figure 7:
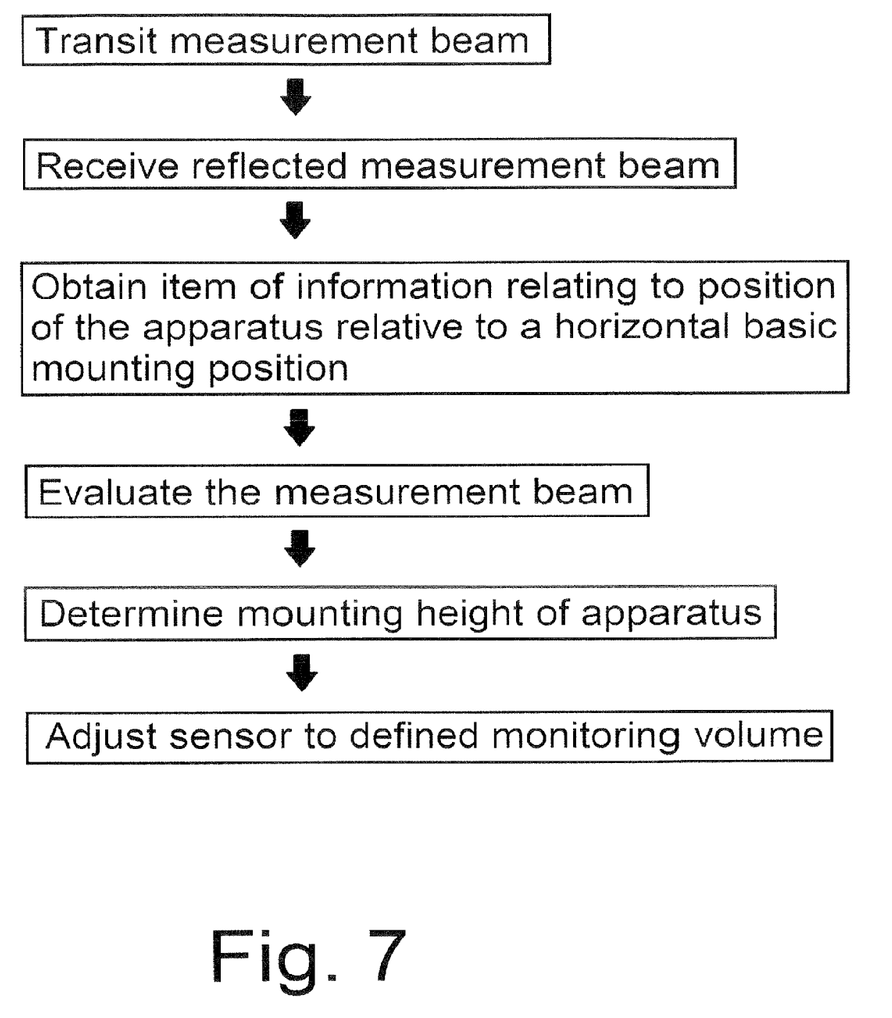
FIG. 7 shows a first flowchart illustrating operation of an embodiment of the present invention.

FIG. 7 shows a flowchart illustrating steps of operation of an embodiment of the present invention.

Figure 8:
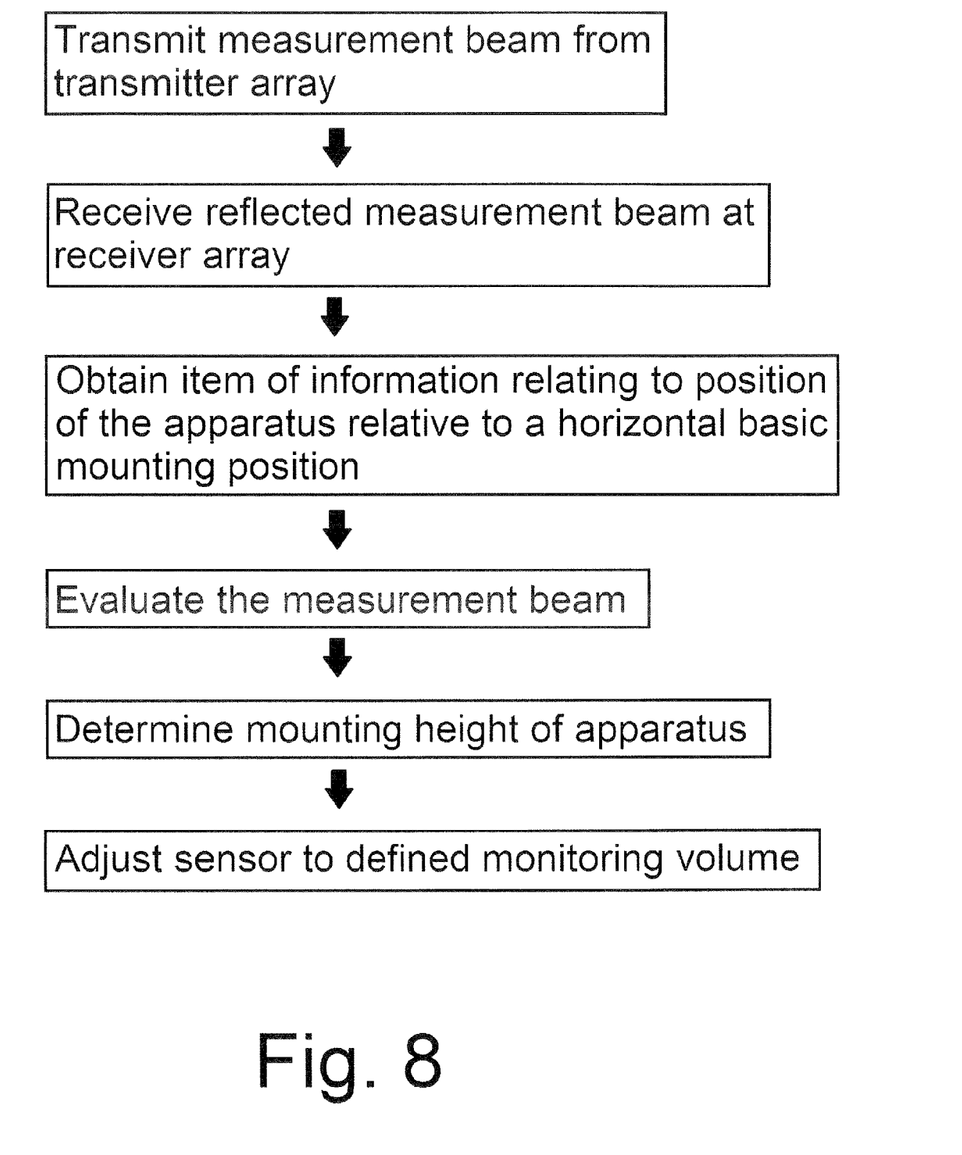
FIG 8 shows a second flowchart illustrating operation of an embodiment of the present invention.

FIG. 8 shows a second flowchart illustrating steps of operation of an embodiment of the present invention that includes a transmitter array and a receiver array.

LIST OF REFERENCE SYMBOLS

1 Housing
2 Mounting frame
2a Latching hook
3 Mounting plate
3a Receptacles
3b Mounting slots
4 Center pin
5 Lateral pin
6 Central bore
7a First bearing bores
7b Second bearing bores
7c Third bearing bores
8 Operating element area
9 Door leaf
10 Hinge
11 Handle
12 Detecting beam path
13 Door leaf side
14 Door leaf edge
15a Measurement beam
15b Measurement beam
16 Double door
17 Corner area
18a, 18b, 18c, 18d and 18e Operating elements

I claim:

1. Apparatus for monitoring a door with a 3D sensor which is able to detect distances to an object in the monitoring area as the third dimension, the 3D sensor being arranged in a housing, and immovably arranged transmission means for transmitting a measurement beam and receiver means for receiving a reflected measurement beam being provided in the housing, said apparatus further comprising a control unit which is designed to obtain an item of information relating to the position of the apparatus relative to a horizontal basic mounting position, and wherein the control unit evaluates the measurement beam on the basis of an item of position information, wherein the control unit is designed to determine a mounting height of the apparatus after mounting by evaluating the measurement beam on the basis of the item of position information, and to use a height of the mounting location as a parameter for defining, a monitoring area, wherein the sensor is adjusted to a defined monitoring volume.

2. Apparatus according to claim 1, wherein position detection means which are designed to automatically detect a position, in particular an absolute position relative to a horizontal of the housing, and to forward said position to a control unit.

3. Apparatus according to claim 1, wherein the apparatus is designed to be fitted in a horizontal basic mounting position and to be fitted in at least two further different mounting positions relative to the horizontal basic mounting position, mounting means for the housing being designed for a mounting orientation which is always the same irrespective of the mounting position of the housing, and the mounting means and the housing being matched to one another in such a manner that a unique orientation of the housing on the mounting means in the respective at least two further mounting positions is ensured by the mounting means.

4. Apparatus according to claim 1, wherein at least two further mounting positions relate to an arrangement of the apparatus in a corner area of a door to be monitored, the mounting means allowing the housing for a corner area to be fitted in a tilted manner with an orientation of the 3D sensor relative to the door to be monitored only in such a manner that a limiting monitoring beam of a monitoring area runs at least approximately parallel to an edge of the door to be monitored.

5. Apparatus according to claim 1, wherein the mounting means allow only precisely three mounting positions of the housing.

6. Apparatus according to claim 1, wherein the mounting means comprise a frame which surrounds the housing.

7. Apparatus according to claim 1, wherein the 3D sensor in a housing comprises a receiver array and/or a transmitter array.

8. Apparatus according to claim 1, wherein the 3D sensor is an imaging sensor in which an object point is imaged onto an associated sensor point.

* * * * *